(12) United States Patent
Ueda

(10) Patent No.: US 6,771,618 B1
(45) Date of Patent: Aug. 3, 2004

(54) PACKET TRANSFER METHOD AND SYSTEM

(75) Inventor: Hitoshi Ueda, Tokyo (JP)

(73) Assignee: NEC Corporation, Tokyo (JP)

( * ) Notice: Subject to any disclaimer, the term of this patent is extended or adjusted under 35 U.S.C. 154(b) by 791 days.

(21) Appl. No.: 09/612,556

(22) Filed: Jul. 7, 2000

(30) Foreign Application Priority Data

Jul. 9, 1999 (JP) .......................................... 11-195329

(51) Int. Cl.$^7$ .............................................. H04Q 7/00
(52) U.S. Cl. ..................................... 370/329; 370/468
(58) Field of Search ................................ 370/328, 329, 370/468, 335, 342, 465

(56) References Cited

U.S. PATENT DOCUMENTS

| | | | | |
|---|---|---|---|---|
| 4,980,886 | A | | 12/1990 | Bernstein |
| 5,673,259 | A | * | 9/1997 | Quick, Jr. .................. 370/342 |
| 5,914,936 | A | | 6/1999 | Hatono et al. |
| 6,347,091 | B1 | * | 2/2002 | Wallentin et al. ........... 370/437 |
| 6,483,820 | B1 | * | 11/2002 | Davidson et al. ........... 370/329 |
| 6,519,461 | B1 | * | 2/2003 | Andersson et al. ......... 455/453 |
| 6,594,241 | B1 | * | 7/2003 | Malmlof ..................... 370/329 |

FOREIGN PATENT DOCUMENTS

| | | | | |
|---|---|---|---|---|
| EP | 0967755 | A1 | * 12/1999 | ........... H04L/12/28 |
| JP | 2-143637 | | 6/1990 | |
| JP | 6-104917 | | 4/1994 | |
| JP | 9-214459 | | 8/1997 | |
| JP | 9-307561 | | 11/1997 | |
| JP | 11-136255 | | 5/1999 | |

OTHER PUBLICATIONS

English Abstract of Japanese Patent 2-143637.

Toskala et al., "FRAMES FMA2 Wideband–CDMA for UMTS," *European Transactions on Telecommunications, Eurel Publication* (Jul. 1998), vol. 9, No. 4, pp. 325–335, XP000778096, ISSN: 1124–318X.

Lee et al., "Architecture and Performance Analysis of Packet–Based Mobile Switching Center–to–Base Station Traffic Communications for TDMA," *Bell Labs Technical Journal* (Jun. 21, 1997), vol. 2, No. 3, pp. 46–56, XP000703740, ISSN: 1089–7089, Bell Laboratories, US.

* cited by examiner

*Primary Examiner*—Chau Nguyen
*Assistant Examiner*—Christine Ng
(74) *Attorney, Agent, or Firm*—Foley & Lardner LLP

(57) ABSTRACT

An object of the present invention is to provide a packet transfer method and system adapted to minimize delay in data and discard of data in a mobile communication system, and thus to provide improvements in processing ability and service quality in a base station and a switching center. A packet transfer method in a mobile communication system according to the present invention, the mobile communication system having a wire line for interconnecting a base station and a switching center, the wire line including a shared channel and a dedicated channel in which the shared channel can be shared by multiple terminals, while the dedicated channel can be used by only one of the terminals, and when a quantity of data transferred from the terminal is equal to or greater than a predetermined value, then the packet transfer method allocating the dedicated channel to the terminal, comprising that, in data transfer through the dedicated channel, when the data transferred from the terminal is waited because of an excessive quantity of transferred data, and further when a queuing data quantity of the data is equal to or greater than a predetermined delay data quantity-generating value, then another dedicated channel is allocated to the terminal, thereby transferring the data through the dedicated channel and such an additional dedicated channel until the queuing data quantity is equal to or less than a predetermined delay data quantity-restoring value.

20 Claims, 11 Drawing Sheets

PACKET TRANSFER METHOD AND SYSTEM

BACKGROUND OF THE INVENTION

The present invention relates to a packet transfer method and system. More particularly, it relates to a system and method for controlling packet data transfer in mobile data communication.

Conventionally, packet transmission in a mobile communication system will be described with reference to FIG. 11. The mobile communication system includes a plurality of terminals 110a–110c, a base station 120 connected to the terminals 110a–110c via wireless lines, and a switching center 130 linked to the base station 120 via wire lines. The switching center 130 is connected to a network 140, which is one type of a public network of PSTN (Plain Service Telephone Network). Each of the terminals 110a–110c includes an information terminal unit and a mobile unit such as a PHS or cell phone terminal linked to the information terminal unit.

The wire line for interconnecting the base station 120 and the switching center 130 includes a shared channel and a dedicated channel. The shared channel can be shared by the multiple terminals, while the dedicated channel can exclusively be used by one of the terminals.

When a quantity of data transferred from the terminal is equal to or greater than a predetermined value, then the dedicated channel is allocated to the terminal, thereby allowing the data transferred from the terminal to be transferred through the dedicated channel.

However, in such a conventional data communication system, an enormous volume of data as well as poor quality of transmission is likely to bring about delay in data or discard of data, with concomitant reductions in processing ability and service quality in the base station and the switching center.

In view of the above problem, an object of the present invention is to provide a packet transfer method and system adapted to minimize delay in data and discard of data in the mobile communication system, and thus to provide improvements in processing ability and service quality in the base station and the switching center.

SUMMARY OF THE INVENTION

The above objective of the present invention is achieved by a data transfer method in a mobile data communication system including a mobile terminal, a base station communicated to the mobile terminal by wireless, and a switching center connected to the base station via a wire line, comprising that, when a quantity of data residing in a dedicated channel of the wire line between the base station and the switching center exceeds a predetermined. value, the dedicated channel being exclusively allocated to the mobile terminal, then a further dedicated channel is allocated to the mobile terminal, thereby transmitting the data through the multiple dedicated channels.

Further, the objective of the present invention is achieved by a data transfer method in a mobile data communication system including a mobile terminal, a base station communicated to the mobile terminal by wireless, and a switching center connected to the base station via a wire line, comprising that, when a quantity of data residing in a dedicated channel of the wire line between the base station and the switching center exceeds a predetermined value, the dedicated channel being exclusively allocated to the mobile terminal, then a shared channel to be shared by the multiple mobile terminals is applied to the mobile terminal, thereby transmitting the data through the shared channel and the dedicated channel.

A mode for carrying out the present invention will now be described. A communication system embodying the present invention includes a plurality of terminals, a base station connected to the terminals via wireless lines, and a switching center linked to the base station via a plurality of wire lines. The wire line includes a shared channel and a dedicated channel in which the shared channel can be shared by the terminals, while the dedicated channel can be used by only one of the terminals.

A packet transfer method in the communication system permits data transferred from the terminal to be transferred by packets in which the data are separated by a certain length. When a quantity of data transferred from the terminal is equal to or greater than a predetermined value, then the packet transfer method allocates the dedicated channel to the terminal, thereby permitting the data transferred from the terminal to be transferred through the dedicated channel. In the packet transfer method according to the present invention, in data transfer through the dedicated channel that is allocated to the terminal, when data transferred from the terminal is waited because of an excessive quantity of such transferred data, and further when a queuing data quantity of the data is equal to or greater than a predetermined delay data quantity-generating value, then another dedicated channel (hereinafter called an "additional dedicated channel") is allocated to the terminal, thereby transferring the data through the dedicated channel and the additional dedicated channel until the queuing data quantity is equal to or less than a predetermined delay data quantity-restoring value.

Processing to allocate the additional dedicated channel according to one embodiment of the present invention includes the following steps:

At step S1, the base station determines whether a queuing data quantity of data transferred from the terminal is equal to or greater than a delay data quantity-generating value. When the determination results in "YES", then the base station requests the switching center through the shared channel to allocate the additional dedicated channel to the terminal.

At step S2, the switching center determines upon receipt of such a request from the base station whether the additional dedicated channel can be allocated to the terminal. Then, the switching center delivers the result of the determination to the base station through the shared channel.

At step S3, the base station allocates the additional dedicated channel to the terminal upon receipt of the positive result of the determination from the switching center.

Processing to release the additional dedicated channel according to one embodiment of the present invention includes the following steps:

At step S4, the base station, in which the additional dedicated channel has been allocated to the terminal, determines whether a queuing data quantity of data transferred from the terminal is equal to or less than a delay data quantity-restoring value. When the determination results in "YES", then the base station requests the switching center through the shared channel to free the additional dedicated channel from the terminal.

At step S5, the switching center determines upon receipt of such a request from the base station whether the additional dedicated channel already allocated to the terminal can be released therefrom. Then, the switching center conveys the result of the determination to the base station.

At step S6, the base station releases the additional dedicated channel from the terminal upon receipt of the positive result of the determination from the switching center.

Pursuant to a preferred embodiment of the present invention, in the dedicated channel allocated to the terminal, when data transferred from the terminal is waited because of an excessive quantity of transferred data, and further when a queuing data quantity of the data is equal to or greater than a predetermined delay data quantity-generating value, then another dedicated channel (or an "additional dedicated channel") is allocated to the terminal, thereby transferring the data through the additional dedicated channel until the queuing data quantity is equal to or less than a predetermined delay data quantity-restoring value.

Processing to allocate the additional dedicated channel according to one embodiment of the present invention includes the following steps:

At step S11, the switching center determines whether a queuing data quantity of data transferred to the terminal is equal to or greater than a delay data quantity-generating value. When the determination results in "YES", then the switching center requests the base station through the shared channel to allocate the additional dedicated channel to the terminal.

At step S12, the base station determines upon receipt of such a request from the switching center whether the additional dedicated channel can be allocated to the terminal. Then, the base station delivers the result of the determination to the switching center through the shared channel.

At step S13, the switching center allocates the additional dedicated channel to the terminal upon receipt of the positive result of the determination from the base station.

Processing to release the additional dedicated channel according to one embodiment of the present invention includes the following steps:

At step S14, the switching center determines whether a queuing data quantity of data transferred to the terminal is equal to or less than a delay data quantity-restoring value. When the determination results in "YES", then the switching center requests the base station to release the additional dedicated channel to the terminal.

At step S15, the base station determines upon receipt of such a request from the switching center whether the additional dedicated channel already allocated to the terminal can be released from the terminal. Then, the base station conveys the result of the determination to the switching center.

At step S16, the base station releases the additional dedicated channel from the terminal upon receipt of the positive result of the determination from the base station.

Referring now to FIG. 9, pursuant to a preferred embodiment of the present invention, the base station includes a measurement means 103, a mode-switching means 101, a control means 102, a rearrangement means 104, a multi-receiving control means 105, and a multi-receiving release means 106. The measurement means 103 permits a queuing data quantity of data transferred from the terminal to be counted for each dedicated channel, which queuing data quantity resides in a buffer. The mode-switching means 101 switches between a single channel mode and a multi-channel mode. The single channel mode permits the dedicated channel to be applied to the terminal. The multi-channel mode permits the dedicated channel and the additional dedicated channel to be applied together to said terminal. The control means 102 compares a count value obtained by the measurement means 103 with a predetermined delay data quantity-generating value, and then permits the mode-switching means 101 to switch from the single channel mode into the multi-channel mode on the base of the result of such a comparison. Meanwhile, the control means 102 compares a count value obtained by the measurement means 103 with a predetermined delay data quantity-restoring value, and then permits the mode-switching means 101 to switch from the multi-channel mode into the single channel mode on the base of the result of such a comparison. The rearrangement means 104 permits data to the terminal to be rearranged in the order of a sequence number upon receipt of the data when the mode-switching means 101 switches from the single channel mode into the multi-channel mode. The multi-receiving control means 105 requests the switching center to resend data having an expected sequence number when such data needs to be resent from the switching center to the base station because the base station does not receive the data from the switching center after a certain period of time has elapsed. The multi-receiving release means 106 confirms the absence of transferred data through the additional dedicated channel when the mode-switching means 101 switches from the multi-channel mode into the single channel mode.

Turning now to FIG. 10, pursuant to a preferred embodiment of the present invention, the switching center includes a measurement means 203, a mode-switching means 201, a control means 202, a rearrangement means 204, a multi-receiving control means 205, and a multi-receiving release means 206. The measurement means 203 permits a queuing data quantity of data transferred from the terminal to be counted for each dedicated channel, which queuing data quantity resides in a buffer. The mode-switching means 201 switches between a single channel mode and a multi-channel mode. The single channel mode permits the dedicated channel to be applied to the terminal. The multi-channel mode permits the dedicated channel and the additional dedicated channel to be applied together to the terminal. The control means 202 compares a count value obtained by the measurement means 203 with a predetermined delay data quantity-generating value, and then permits the mode-switching means 201 to switch from the single channel mode into the multi-channel mode on the base of the result of such a comparison. Meanwhile, the control means 202 compares a count value obtained by the measurement means 203 with a predetermined delay data quantity-restoring value, and then permits the mode-switching means 201 to switch from the multi-channel mode into the single channel mode on the base of the result of such a comparison. The rearrangement means 204 permits data to the terminal to be rearranged in the order of a sequence number upon receipt of the data when the mode-switching means 201 switches from the single channel mode into the multi-channel mode. The multi-receiving control means 205 requests the base station to resend data having an expected sequence number when such data needs to be resent from the base station to the switching center because the switching center does not receive the data from the base station after a certain period of time has elapsed. The multi-receiving release means 206 confirms the absence of transferred data through the additional dedicated channel when the mode-switching means 201 switches from the multi-channel mode into the single channel mode.

Pursuant to another embodiment of the present invention, in the dedicated channel exclusively allocated to the terminal, when data transferred from the terminal is waited because of an excessive quantity of transferred data, and further when a queuing data quantity of the data is equal to or greater than a delay data quantity-generating value, then a terminal ID may be provided to the transferred data in order to prevent the queuing data quantity from being equal to or greater than the delay data quantity-generating value, thereby transferring the data through the shared channel.

In this embodiment, a sending section in the base station for receiving data from the terminal and then sending the data to the switching center provides a terminal identifier to packet data that is delivered through the shared channel, not through the dedicated channel. The switching center extracts the data transmitted from the terminal through the shared channel, and then causes the extracted data to be rearranged in the order of a sequence number, together with data from the dedicated channel.

In this embodiment, a sending section in the switching center for receiving data to the terminal through a public telephone network and then sending the data to the base station provides a terminal identifier to packet data that is delivered through the shared channel, not through the dedicated channel. The base station extracts the data transmitted from the terminal through the shared channel, and then causes the extracted data to be rearranged in the order of a sequence number, together with data from the dedicated channel.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Figure 1:
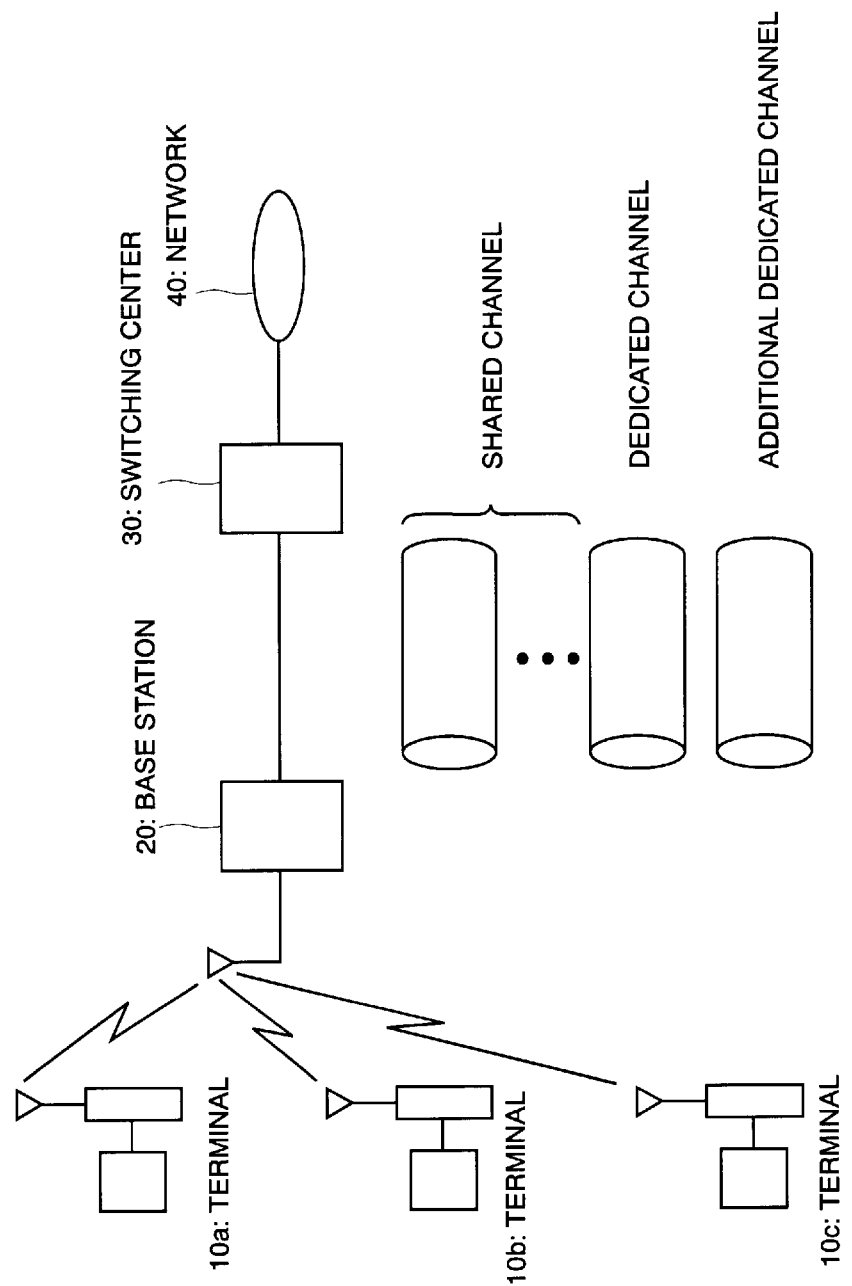
FIG. 1 is an illustration, showing the entire structure of a mobile communication system according to a first embodiment of the present invention.

Embodiments of the present invention will now be described with reference to the drawings. FIG. 1 is an illustration, showing a structure of a mobile communication system according to a first embodiment. Referring to FIG. 1, this system includes a plurality of terminals 10a–10c, a base station 20 connected to the terminals 10a–10c via wireless lines, and a switching center 30 connected to the base station 20 via wire lines. The switching center 30 is linked to a network 40 that is one type of a public network of PSTN. The wire line for interconnecting the base station 20 and the switching center 30 includes a shared channel and a dedicated channel. The shared channel can be shared by the multiple terminals, while the dedicated channel can exclusively be used by one of the terminals.

Figure 2:
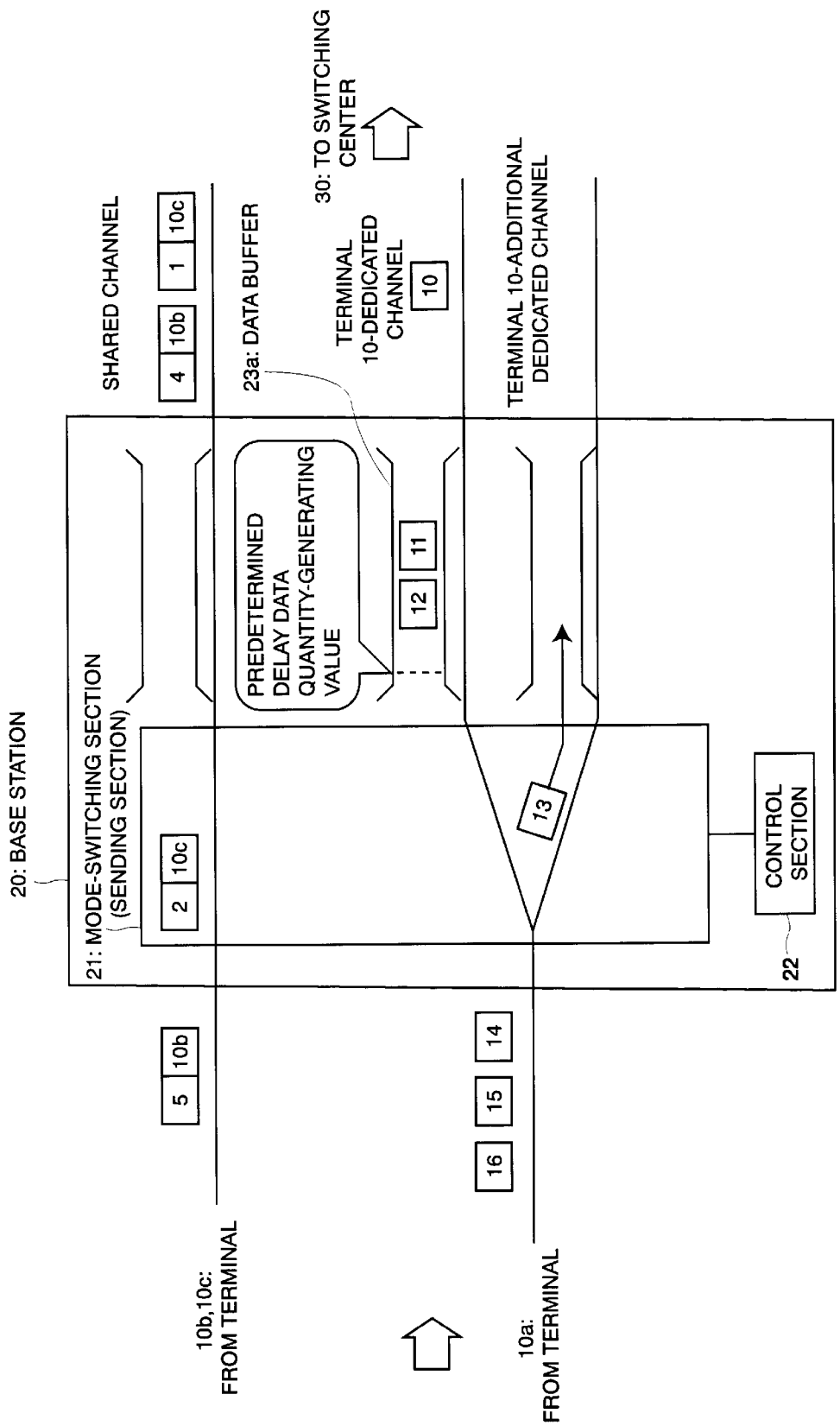
FIG. 2 is an illustration, showing a structure of a base station according to the first embodiment.
Figure 9:
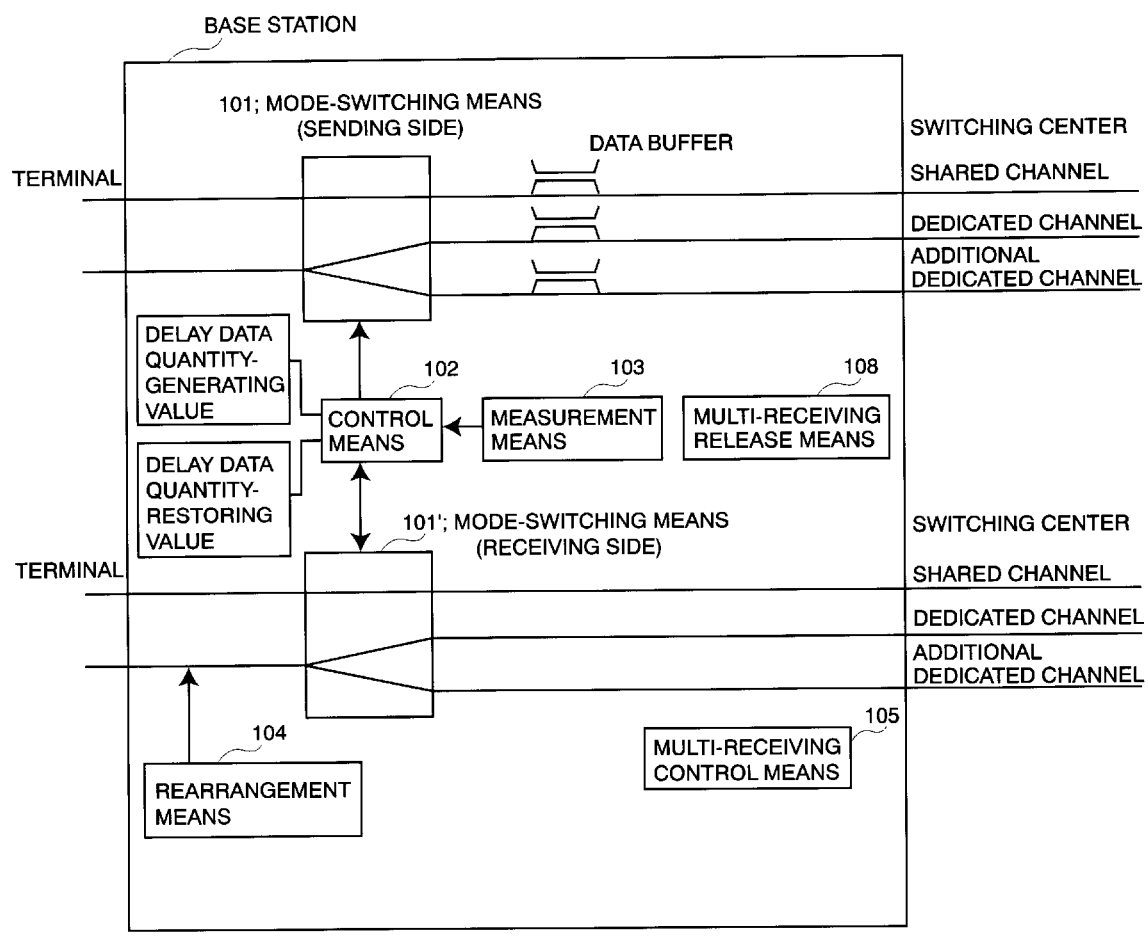
FIG. 9 is an illustration, showing a structure of a base station according to one embodiment of the present invention.

FIG. 2 is an illustration, showing structural features in the base station 20 according to one embodiment of the present invention. Referring to FIG. 2, the base station 20 includes a mode-switching section (sending side) 21 for switch-over between a single channel and a multi-channel, a control section 22 for controlling the mode-switching section 21, and a data buffer 23a. A mode-switching section (receiving side) in the base station 20 is illustrated in FIG. 9, not shown in FIG. 2. The mode-switching section (receiving side) is comparable to the under-mentioned mode-switching section (receiving side) 31 in the switching center 30, and is further controlled by the control section 22.

Figure 3:
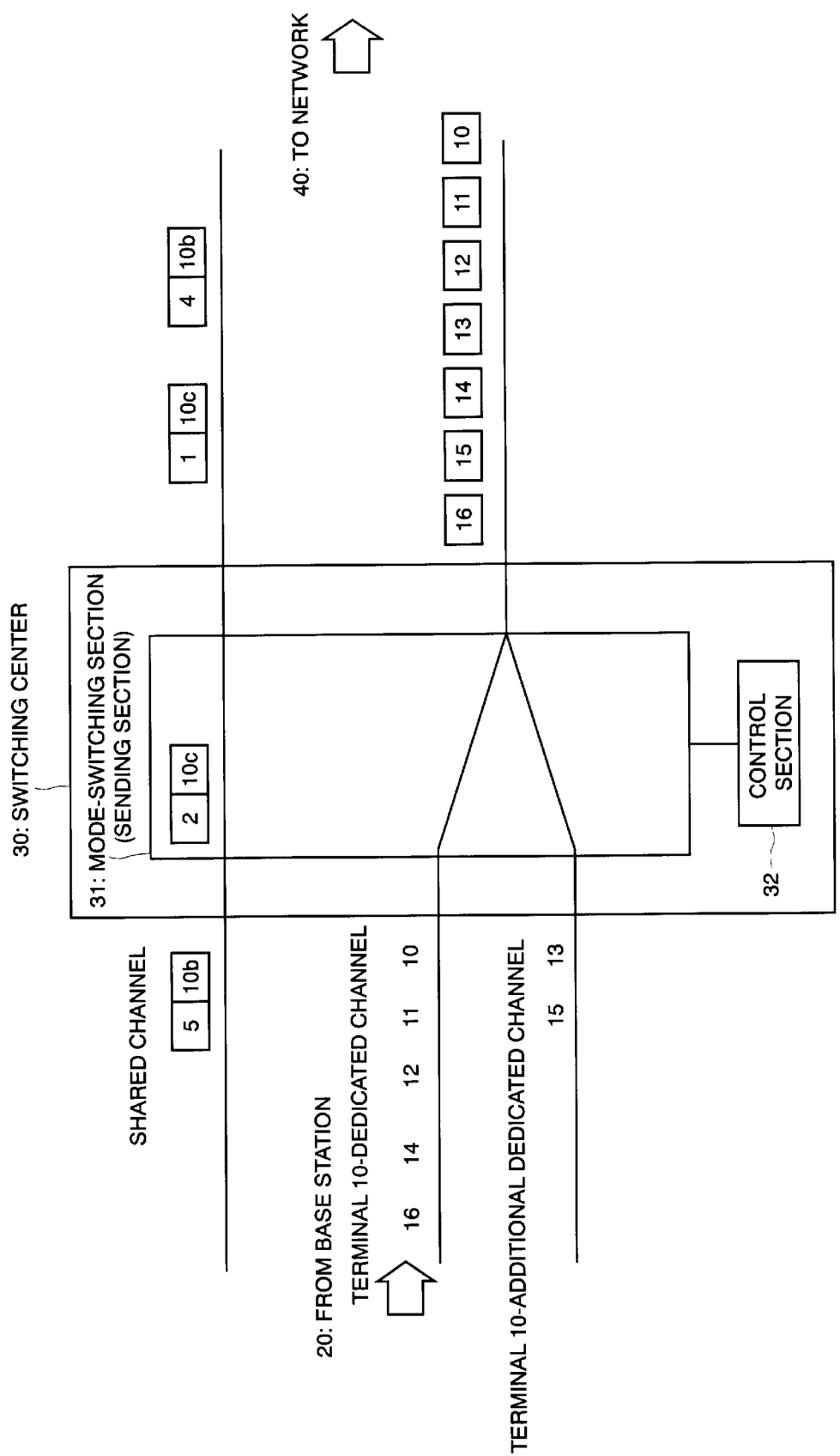
FIG. 3 is an illustration, showing a structure of a switching center according to the first embodiment.
Figure 10:
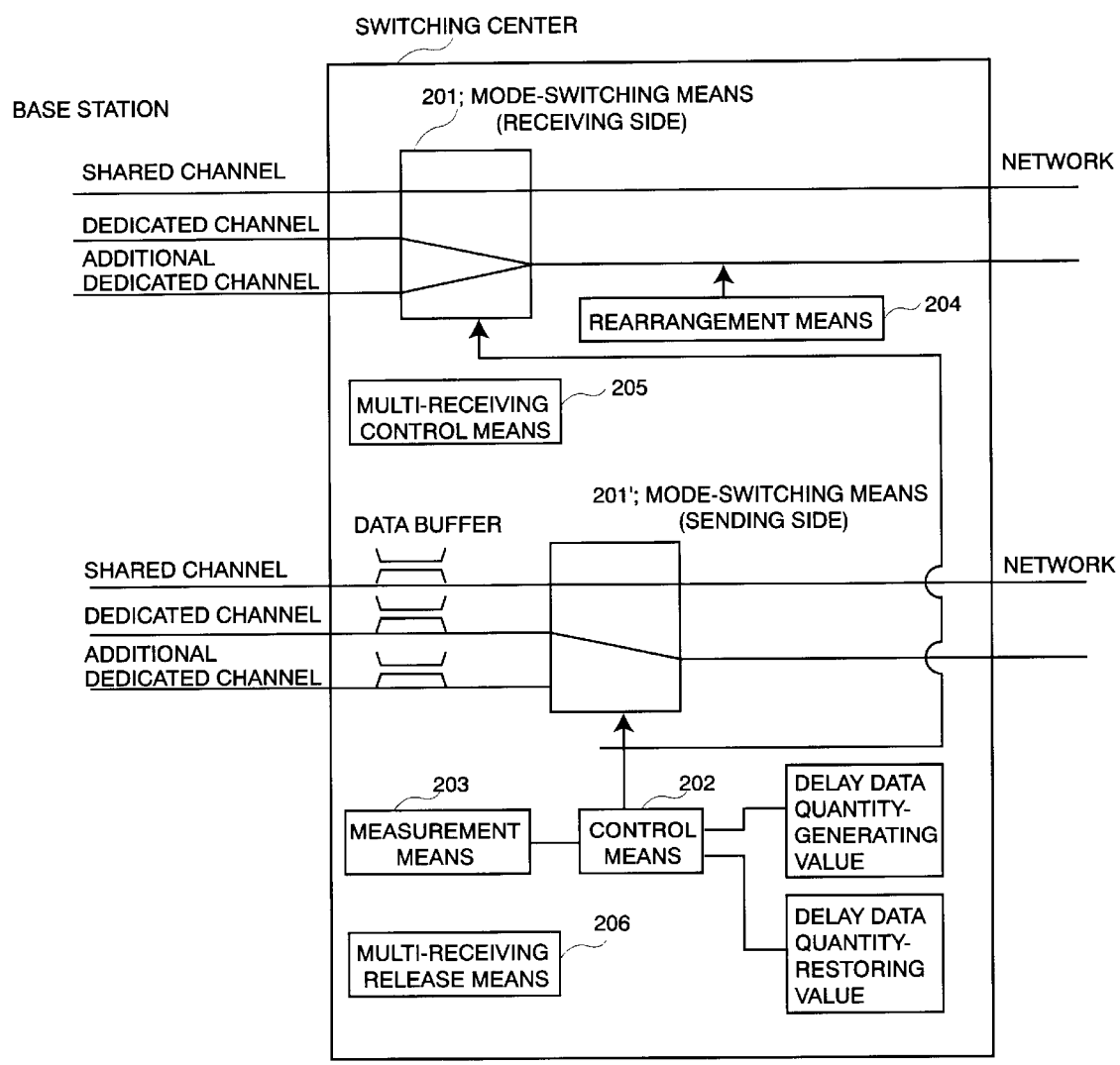
FIG. 10 is an illustration, showing a structure of a switching center according to one embodiment of the present invention; and, FIG. 11 is an illustration, showing a structure of a conventional mobile communication system.
Figure 11:
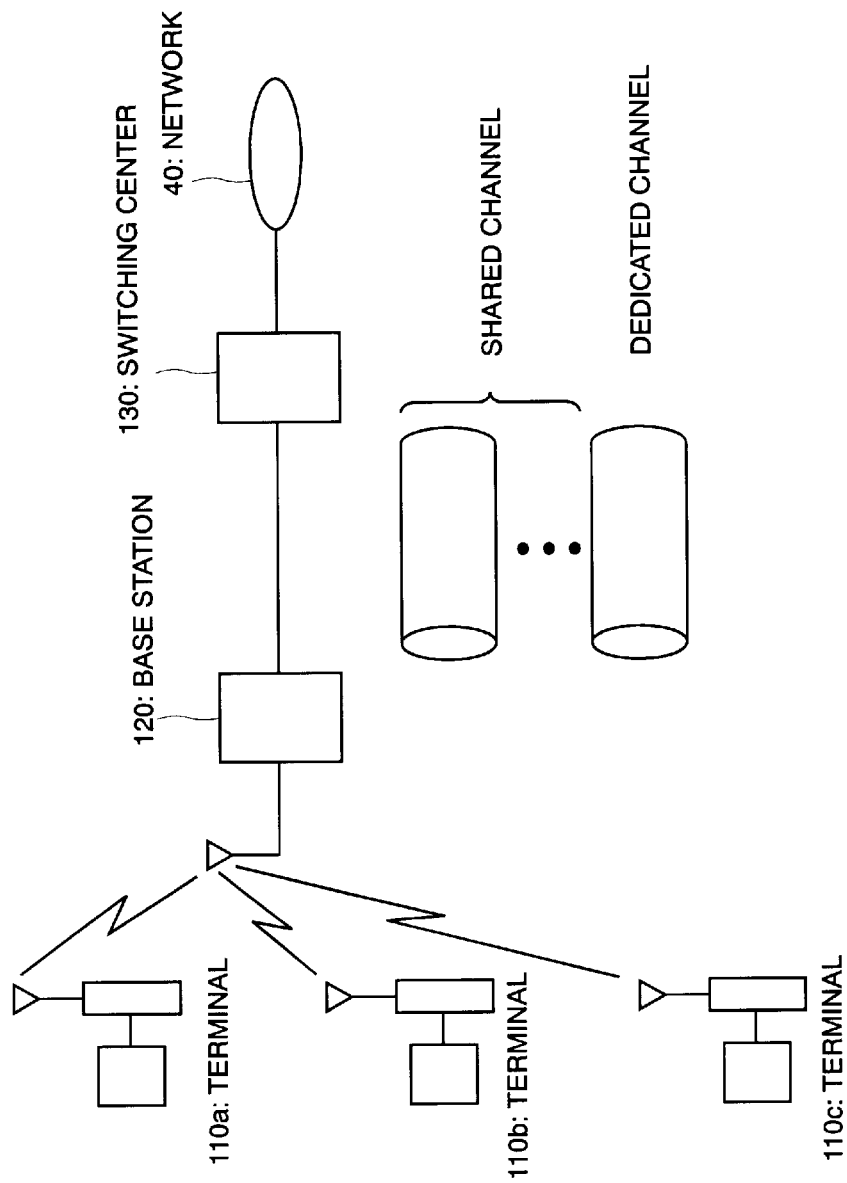

FIG. 3 is an illustration, showing structural features of the switching center 30 according to one embodiment of the present invention. Referring to FIG. 3, the switching center 30 includes the mode-switching section (receiving side) 31 for switching between a single channel and a multi-channel and a control section 32 for controlling the mode-switching section 31. A mode-switching section (sending side) in the switching center 30 is illustrated in FIG. 10, not shown in FIG. 3. The mode-switching section (sending side) is comparable to the mode-switching section (sending side) 21 in the base station 20, and is further controlled by the control section 32.

The wire line for interconnecting the base station 20 and the switching center 30 includes a shared channel and a dedicated channel. The shared channel can be shared by the multiple terminals, while the dedicated channel can exclusively be used by one of the terminals.

Figure 4:
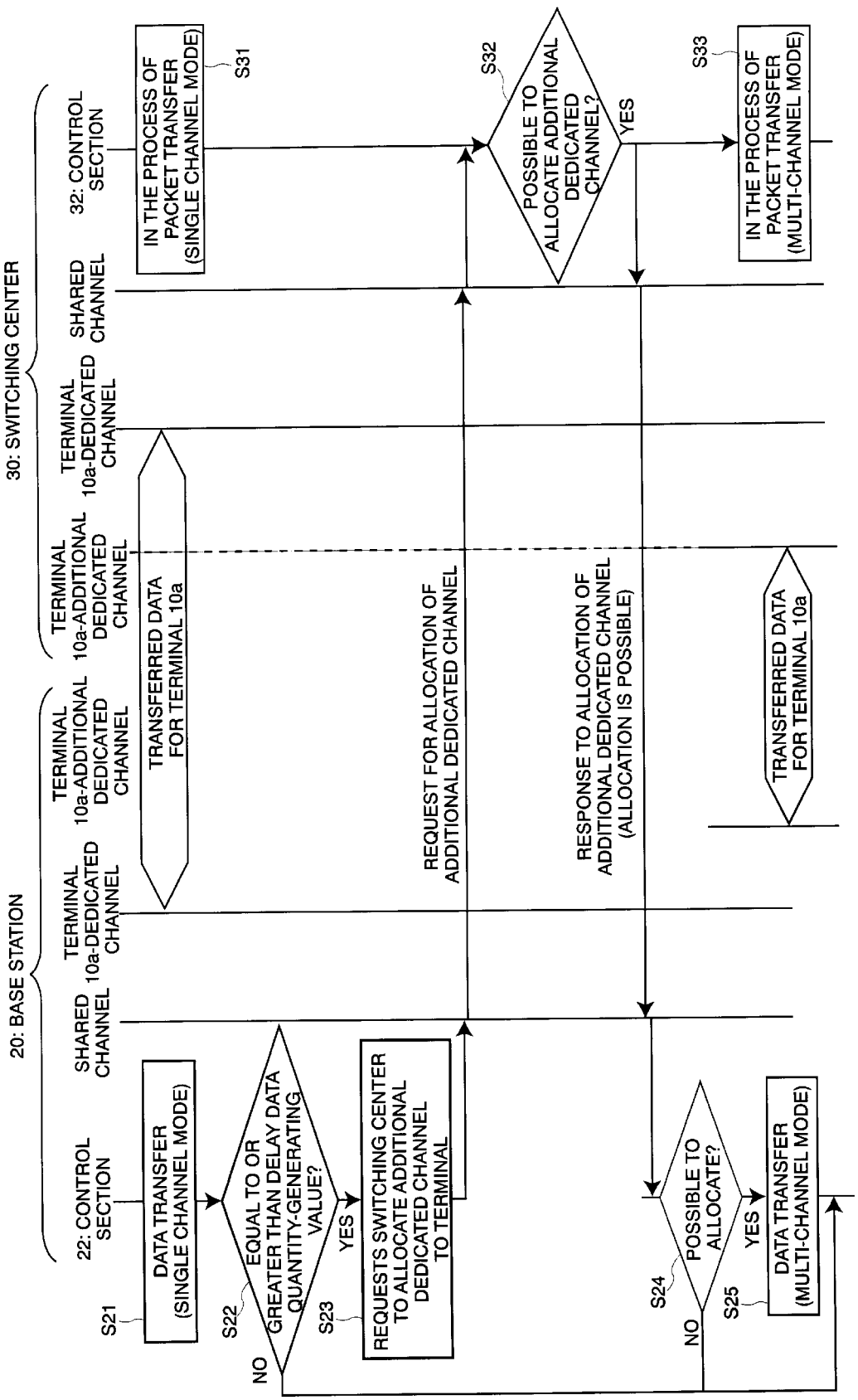
FIG. 4 is an illustration, describing a course of action according to the first embodiment.

FIG. 4 is an illustration, describing packet transfer according to one embodiment of the present invention.

Assume that the terminal 10a transfers data through the dedicated channel because transferred data is equal to or greater than a predetermined value, and further that the terminals 10b, 10c transfer data through the shared channel because such transferred data is less than the predetermined value.

In the base station 20, the control section 22 measures a quantity of data residing in the data buffer 23a of the terminal 10a-dedicated channel (using the measurement means 103 in FIG. 9) when the data is transferred from the terminal 10a through the preceding dedicated channel between the base station 20 and the switching center 30 during a single channel mode (at steps S21 and S31.). The control section 22 compares the above data quantity in the data buffer 23a with a predetermined delay data quantity-generating value, and then determines whether such a data quantity is equal to or greater than the delay data quantity-generating value (at step S22).

When the determination in step S22 results in "YES", then the control section 22 requests the switching center 30 through the shared channel to allocate a further dedicated channel (hereinafter called an "additional dedicated channel") to the terminal 10a (at step S23). In this instance, the quantity of data residing in the data buffer 23a is "2" (see FIG. 2), and assume that the delay data quantity-generating value is "2" as well. In this state, the above request for allocation is made.

The switching center 30 determines whether the additional dedicated channel can be allocated to the terminal 10a (at step S32).

When the determination in step S32 results in "YES", then the switching center 30 sends such a result to the base station 20.

Then, the base station 20 checks such a response from the switching center 30 to determine whether the additional dedicated channel can be allocated to the terminal 10a (at step S24).

When the determination in step S24 results in "YES", then the control section 22 controls respective operations of the mode-switching section (sending side) 21 and the mode-switching section (receiving side) (not shown) in the base station 20, and then sets them from the single channel mode into a multi-channel mode (at step S25). Similarly to the base station 20, the control section 32 in the switching center 30 controls respective operations of the mode-switching section (receiving side) 31 and the mode-switching section (sending side) (not shown), and then sets them from the single channel mode into the multi-channel mode (at step S33).

In data sending during the multi-channel mode, the mode-switching section (sending) 21 in the base station 20 sends data through the multi-channel including the terminal 10a-dedicated channel and the terminal 10a-additional dedicated channel in order to prevent a quantity of data residing in the data buffer 23a of the terminal 10a-dedicated channel from being equal to or greater than the delay data quantity-generating value. In data receiving, the mode-switching section (receiving side) 31 in the switching center 30 transfers data by received data (packets) being rearranged in the order of a sequence number. For example, as illustrated in FIG. 3, the packets transmitted through the terminal 10a-dedicated channel and the terminal 10a-additional dedicated channel are arranged in the order of the sequence number by means of the rearrangement means 204 in FIG. 10 before being transmitted to the network 40. During the multi-channel mode, the switching center 30 (the multi-receiving control means 205 in FIG. 10) requests the base station 20 to resend data having an expected sequence number when such data needs to be resent from the base station 20 to the switching center 30 because the switching center 30 does not receive the data from the base station 20 after a certain period of time has elapsed.

Next, processing to release the additional dedicated channel will be described. When a quantity of data residing in the data buffer 23a of the terminal 10a-dedicated channel is equal to or less than a predetermined delay data quantity-restoring value, then both of the base station 20 and the switching center 30 use the shared channel to confirm the absence of data transferred through the terminal 10a-additional dedicated channel (using the multi-receiving release means 106 and 206 in FIGS. 9 and 10, respectively). Thereafter, the additional dedicated channel is released from the terminal 10a, thereby causing the mode-switching sections to switch over to the single channel mode.

At this time, the delay data quantity-generating value and the delay data quantity-restoring value can individually be set according to a number of times of call, and must not be necessarily equal to one another. In order to avoid the frequent occurrence of setting and release of the additional dedicated channel, the delay data quantity-generating value and the delay data quantity-restoring value are preferably related as follows:

"delay data quantity-generating values">"delay data quantity-restoring value"

When it is determined at step S22 that a quantity of data residing in the data buffer 23a is less than the delay data quantity-generating value, and further when it is determined at step S24 that the additional dedicated channel cannot be allocated to the terminal 10a, then the data is transferred only through the terminal 10a-dedicated channel.

In data transfer from the terminal (ascending data transfer), a description has been made to transfer in the multi-channel mode in which the dedicated channel and the additional dedicated channel are used together between the base station and the switching center. Meanwhile, data transfer to the terminal is practiced according to the following steps:

The switching center 30 measures a queuing data quantity of data transferred to the terminal in the dedicated channel. The control section 32 determines whether such a measured value is equal to or greater than a delay data quantity-generating value. When the determination results in "YES", then the switching center 30 requests the base station 20 through the shared channel to allocate the additional dedicated channel to the terminal. The base station 20 determines upon such a request from the switching center 30 whether the additional dedicated channel can be allocated to the terminal. The base station 20 conveys the result of the determination to the switching center 30 through the shared channel.

The switching center 30 allocates the additional dedicated channel to the terminal upon receipt of the positive result of the determination from the base station 20. Then, the mode-switching section (sending side) (denoted by reference numeral 201' in FIG. 10) is set from the single channel mode into the multi-channel mode. The base station 20 receives data transferred through the multi-channel including the dedicated channel and the addition dedicated channel. The mode-switching section (receiving section) in the base station 20 causes received data (packets) to be rearranged in the order of a sequence number by means of the rearrangement means 104 in FIG. 9 before sending the data to the terminal. During the multi-channel mode, the base station 20 requests the switching station 30 to resend data having an expected sequence number (using the multi-receiving control means 105 in FIG. 9) when such data needs to be resent from the switching station 30 to the base station 20 because the base station 20 does not receive the data from the switching station 30 after a certain period of time has elapsed.

The switching center 30 determines whether a queuing data quantity of data transferred to the terminal through the dedicated channel is equal to or less than a delay data quantity-restoring value. When the determination results in "YES", then the switching center 30 requests the base station 20 through the shared channel to permit the additional dedicated channel already allocated to the terminal to be released from the terminal. The base station 20 determines upon receipt of such a request from the switching center 30 whether the additional dedicated channel can be released from the terminal. The base station 20 delivers the result of the determination to the switching center 30. The switching center 30 releases the additional dedicated channel from the terminal upon receipt of the positive result of the determination from the base station 20.

Figure 5:
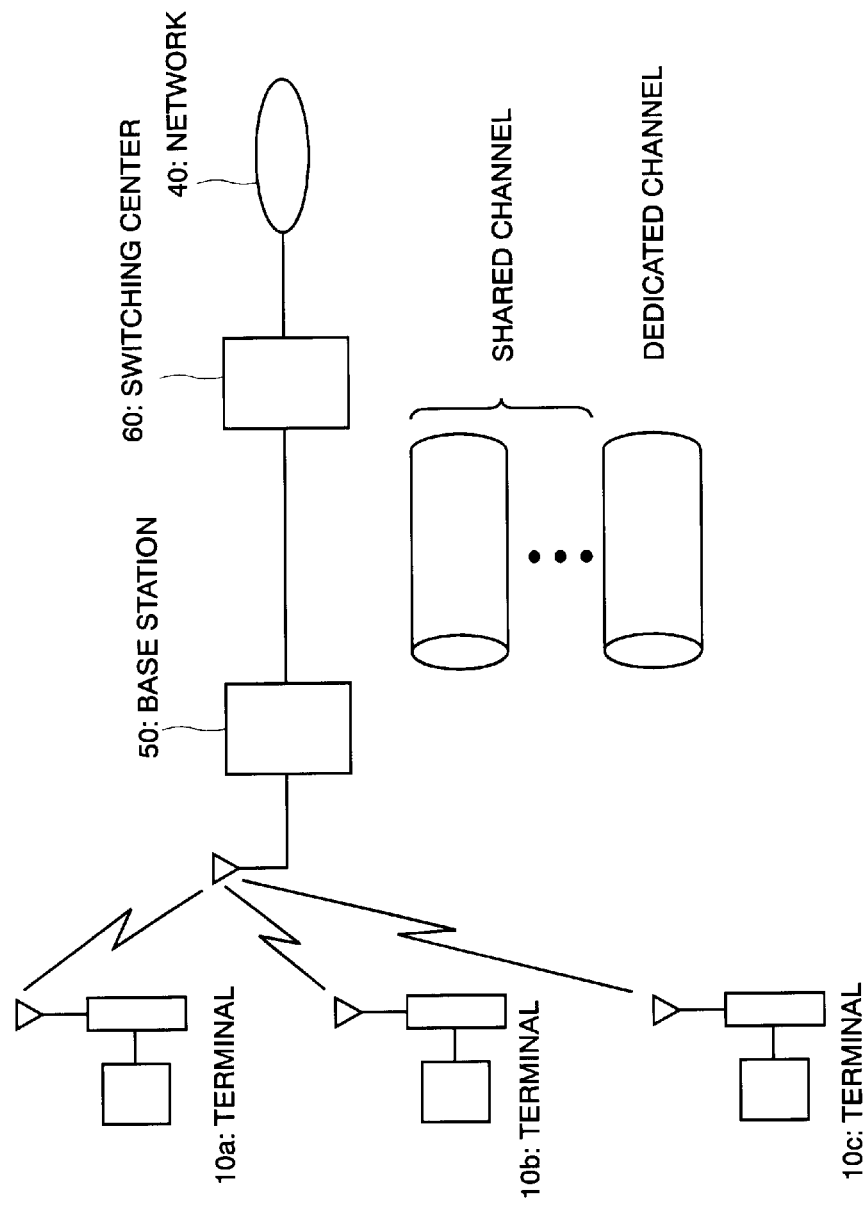
FIG. 5 is an illustration, showing the entire structure of a mobile communication system according to a second embodiment of the present invention.

A second embodiment of the present invention will now be described. FIG. 5 is an illustration, showing the second embodiment. As illustrated in FIG. 5, this mobile communication system includes a plurality of terminals 10a–10c, a base station 50 connected to the terminals 10a–10c via wireless lines, and a switching center 60 linked to the base station 50 via wire lines. The switching center 60 is linked to a network 40, which is one type of a public network or PSTN. Similarly to the previously described embodiment, the wire line for interconnecting the base station 50 and the switching center 60 includes a shared channel and a dedicated channel. The shared channel can be shared by the multiple channels, while the dedicated channel can exclusively be used by one of the terminals.

Figure 6:
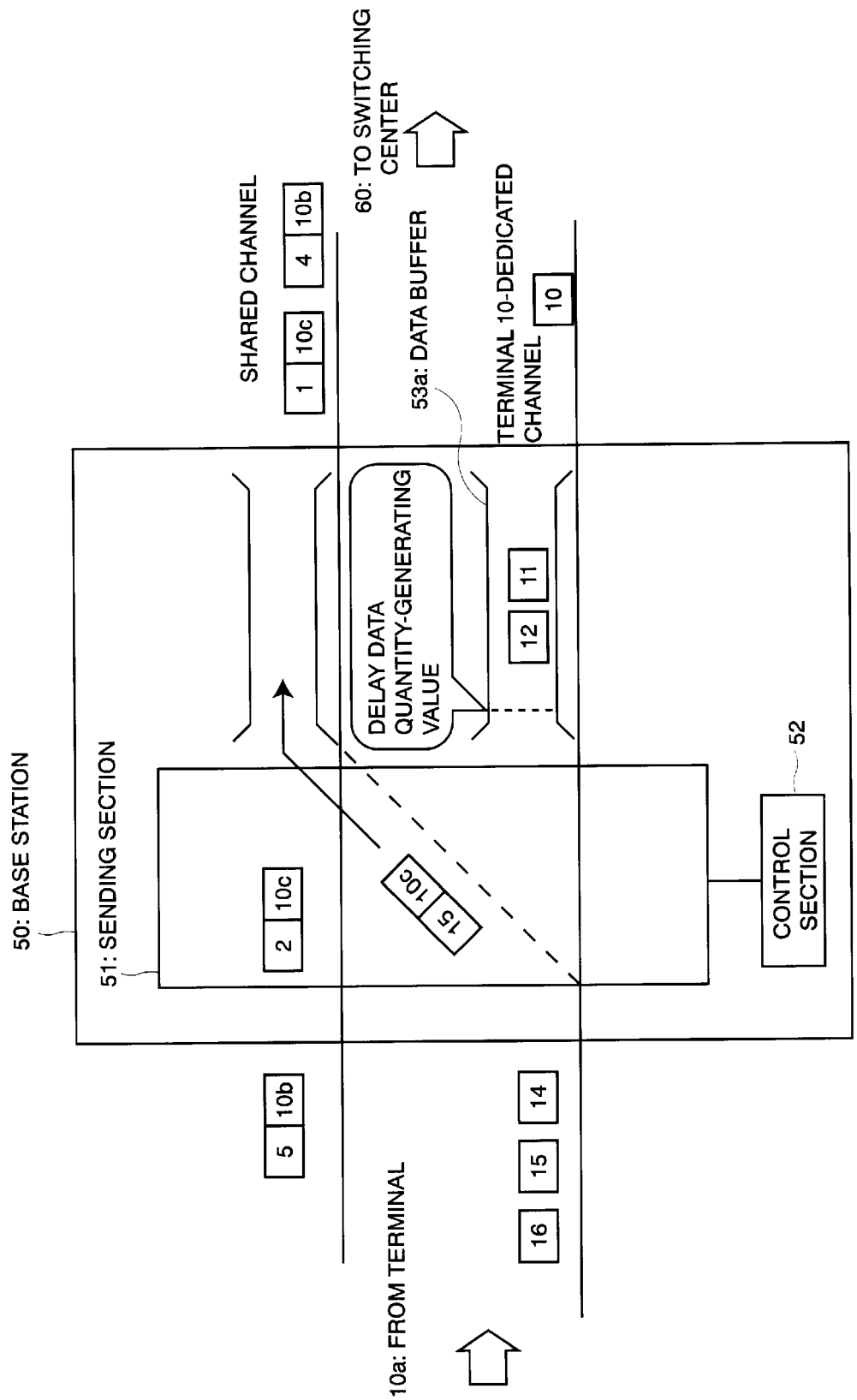
FIG. 6 is an illustration, showing a structure of a base station according to the second embodiment.

FIG. 6 is an illustration, showing a structure of the base station 50 according to the second embodiment. Referring to FIG. 6, the base station 50 includes a sending section 51, a control section 52 for controlling the sending section 51, and a data buffer 53a. In FIG. 5, a receiving section is not illustrated, but is controlled by the control section 52, as is the case with a receiving section 61 in the switching section 60.

Figure 7:
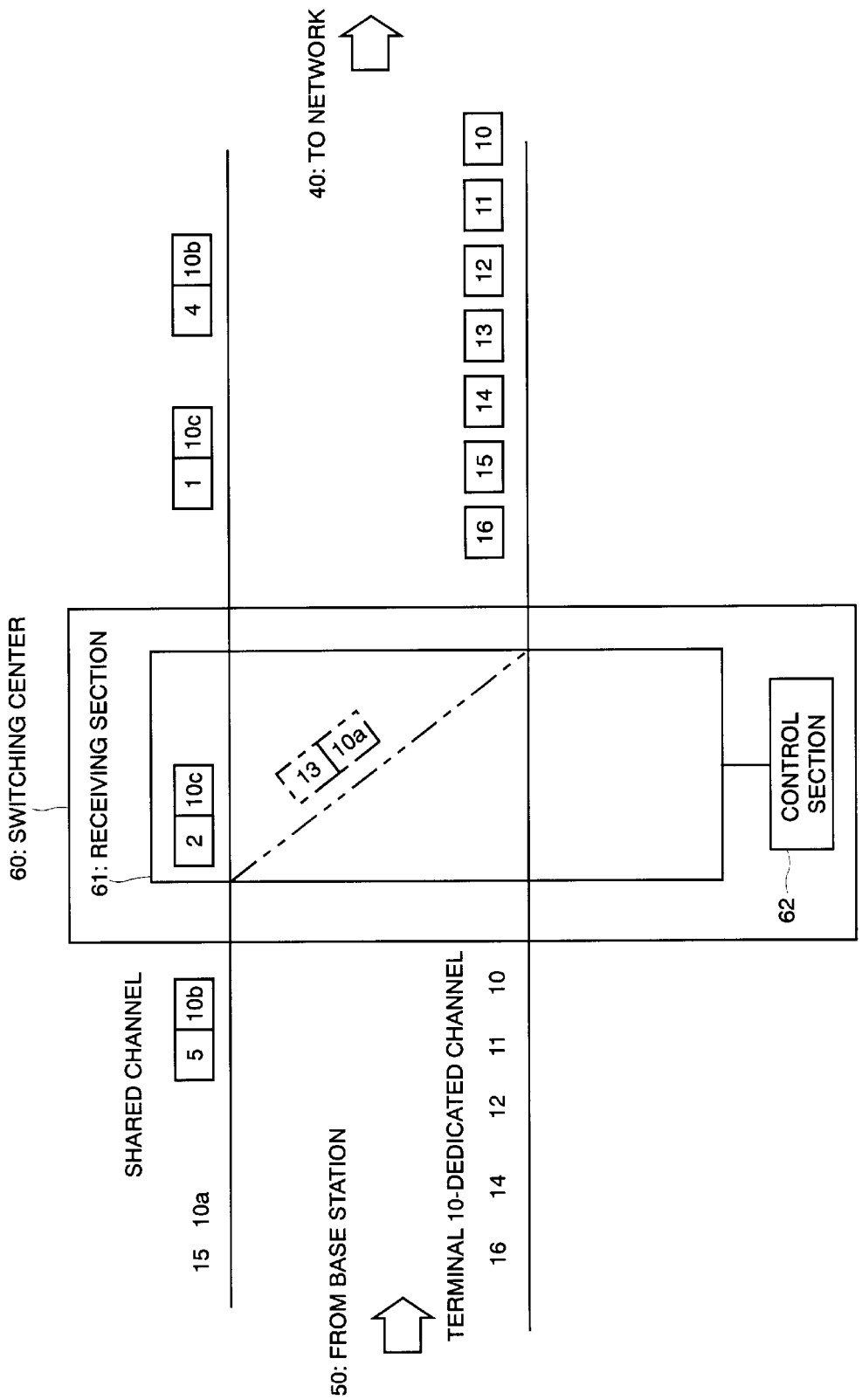
FIG. 7 is an illustration, showing a structure of a switching center according to the second embodiment.

FIG. 7 is an illustration, showing a structure of the switching center 60 according to the second embodiment. Referring to FIG. 7, the switching center 60 includes the receiving section 61 and a control section 62 for controlling the receiving section 61. Although not illustrated in FIG. 7, a sending section is controlled by the control section 62, as is the case with the sending section 51 in the base station 50.

Figure 8:
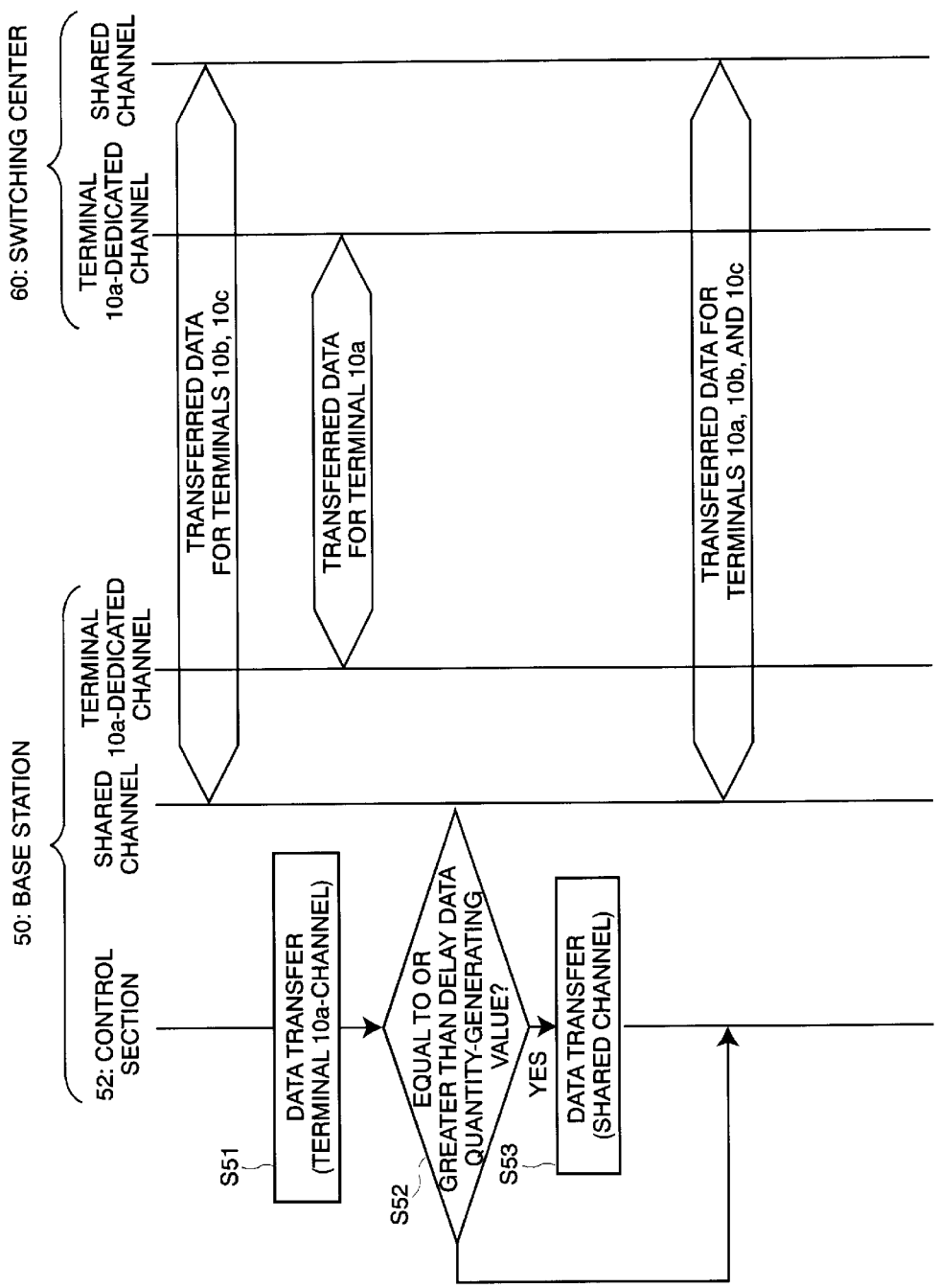
FIG. 8 is an illustration, describing a course of action according to the second embodiment.

FIG. 8 is an illustration, describing packet transfer according to the second embodiment.

Assume that the terminal 10a transfers data through the dedicated channel because such transferred data is equal to or greater than a predetermined value, and further that the terminals 10b, 10c transfer data through the shared channel because such transferred data is less than a predetermined value.

The control section 52 in the base station 50 measures a quantity of data residing in the data buffer 53a of the terminal 10a-dedicated channel when the data is transferred from the terminal 10a through the terminal 10a-dedicated channel between the base station 50 and the switching center 60 (at step S51). The control section 52 compares the measured data quantity with a predetermined delay data quantity-generating value, and then determines whether such a data quantity is equal to or greater than a delay data quantity-generating value (at step S52).

When the determination in step S52 results in "YES", then a data-sending section (the sending section 51 in the base station 50) provides a terminal ID (10a) to terminal 10a-data and then sends the data through the shared channel in order to prevent a quantity of data residing in the data buffer 53a of the terminal 10a-dedicated channel from being equal to or greater than a delay data quantity-generating value. A data-receiving section (the receiving section 61 in the switching section 60) eliminates the terminal ID from the data that is received through the shared channel. Then, data from the dedicated channel and data from the shared channel are rearranged in the order of a sequence number, thereby transferring the data.

When the determination in step S52 results in "NO", then the data is transferred through the terminal 10a-dedicated channel.

As previously described, the present invention provides the following effects:

A first effect of the present invention is to minimize delay in data and discard of data in the mobile communication system, and thus to provide improvements in processing ability and service quality in the base station and the switching center. This is achieved by the feature in which, only when a quantity of data transferred from the terminal is equal to or greater than a predetermined value, then the packet transfer system allocates the dedicated channel to the terminal, and then permits the data to be transferred in the multi-channel mode using the additional dedicated channel, even with an enormous volume of data as well as poor quality of transmission when the data transferred from the terminal is transferred through the dedicated channel.

A second effect of the present invention is to minimize delay in data and discard of data in the mobile communication system, and thus to provide improvements in processing ability and service quality in the base station and the switching center. This is achieved by the feature in which, only when a quantity of data transferred from the terminal is equal to or greater than a predetermined value, then the packet transfer system allocates the dedicated channel to the terminal, and then permits the data to be transferred in the multi-channel mode using the shared channel, even with a large quantity of data as well as inferior quality of transmission when the data transferred from the terminal is transferred through the dedicated channel.

The entire disclosure of Japanese Patent Application No. 11-195329 filed on Jul. 9, 1999 including specification, claims, drawing and summary are incorporated herein by reference in its entirety.

What is claimed is:

1. A packet transfer method in a communication system including a plurality of terminals, a base station connected to said plurality of terminals via wireless lines, and a switching center linked to said base station via a plurality of wire lines, said plurality of wire lines including a shared channel and a dedicated channel in which said shared channel can be shared by said plurality of terminals, while said dedicated channel can be used by only one of said plurality of terminals, said packet transfer method comprising:
  permitting data transferred from said plurality of terminals to be transferred by representing said data by a certain length, and
  when a quantity of data transferred from a given terminal of said plurality of terminals is equal to or greater than a predetermined value, then said a plurality of allocating said dedicated channel to said given terminal, thereby permitting said given data transferred from said terminal to be transferred through said dedicated channel, said packet transfer method further comprising:
  in data transfer through said dedicated channel that is allocated to said given terminal, when said data transferred from said given terminal is waited because of an excessive quantity of transferred data, and further when a queuing data quantity of said data is equal to or -greater than a predetermined delay data quantity-generating value, then allocating an additional dedicated channel to said given terminal, thereby transferring said data through said dedicated channel and said additional dedicated channel until said queuing data quantity is equal to or less than a predetermined delay data quantity-restoring value.

2. A packet transfer method as defined in claim 1, wherein:

(a) said base station determines whether said queuing data quantity of data transferred from said given terminal is equal to or greater than said delay data quantity-generating value, and when such a determination is true, then said base station requests said switching center to allocate said additional dedicated channel to said given terminal;

(b) said switching center determines upon receipt of said request from said base station whether said additional dedicated channel can be allocated to said given terminal, and then said switching center delivers a result of such a determination to said base station; and, (c) said base station allocates said additional dedicated channel to said given terminal upon receipt of positive result of said determination from said switching center.

3. A packet transfer method as defined in claim 1, wherein:

(a) said base station determines whether said queuing data quantity of data transferred from said given terminal is equal to or less than said delay data quantity-restoring value, and when such a determination is true, then said base station requests said switching center to free said additional dedicated channel from said given terminal;

(b) said switching center determines upon receipt of said request from said base station whether said additional dedicated channel already allocated to said given terminal can be released from said given terminal, and then said switching center conveys a result of such a determination to said base station; and, (c) said base station releases said additional dedicated channel from said given terminal upon receipt of positive result of said determination from said switching center.

4. A packet transfer method as defined in claim 1, wherein said delay data quantity-generating value and said delay data quantity-restoring value are individually set according to a number of calls.

5. A packet transfer method in a communication system including a plurality of terminals, a base station connected to said plurality of terminals via wireless lines, and a switching center linked to said base station via a plurality of wire lines, said plurality of wire lines including a shared channel and a dedicated channel in which said shared channel can be shared by said plurality of terminals, while said dedicated channel can be used by only one of said plurality of terminals, said packet transfer method comprising:
permitting data transferred from said plurality of terminals to be transferred by separating said data by a certain length, and only when a quantity of data transferred to a given terminal of said plurality of terminals is equal to or greater than a predetermined value, then allocating said dedicated channel to said given terminal, thereby permitting transferred data from said given terminal to be transferred through said dedicated channel, said packet transfer method further comprising:
in said dedicated channel allocated to said given terminal, when data transferred to said given terminal is waited because of an excessive quantity of transferred data, and further when a queuing data quantity of said data is equal to or greater than a predetermined delay data quantity-generating value, then an additional dedicated-channel is allocated to said given terminal, thereby transferring said data through said additional dedicated channel until said queuing data quantity is equal to or less than a predetermined delay data quantity-restoring value.

6. A packet transfer method as defined in claim 5, wherein:

(a) said switching center determines whether a queuing data quantity of data transferred to said given terminal is equal to or greater than said delay data quantity-generating value, and when such a determination is true, then said switching center requests said base station to allocate said additional dedicated channel to said given terminal;

(b) said base station determines upon receipt of such a request from said switching center whether said additional dedicated channel can be allocated to said given terminal, and then said base station delivers result of such a determination to said switching center; and, (c) said switching center allocates said additional dedicated channel to said given terminal upon receipt of positive result of said determination from said base station.

7. A packet transfer method as defined in claim 5, wherein:

(a) said switching center determines whether a queuing data quantity of data transferred to said given terminal is equal to or less than said delay data quantity-restoring value, and when such a determination is true, then said switching center requests said base station to release said additional dedicated channel from said given terminal;

(b) said base station determines upon receipt of such a request from said switching center whether said additional dedicated channel allocated to said given terminal can be released from said given terminal, and then said base station conveys result of such a determination to said switching center; and, (c) said switching center releases said additional dedicated channel from said given terminal upon receipt of positive result of said determination from said base station.

8. A packet transfer method as defined in claim 5, wherein said delay data quantity-generating value and said delay data quantity-restoring value are individually set according to a number of calls.

9. A packet transfer method in a communication system including a plurality of terminals, a base station connected to said plurality of terminals via wireless lines, and a switching center linked to said base station via a plurality of wire lines, said plurality of wire lines including a shared channel and a dedicated channel in which said shared channel can be shared by said plurality of terminals, while said dedicated channel can be used by only one of said plurality of terminals, said packet transfer method comprising:
permitting data transferred from said plurality of terminals to be transferred by representing said data by a certain length, and when a quantity of data transferred from a given terminal of said plurality of terminals is equal to or greater than a predetermined value, then said a plurality of allocating said dedicated channel to said given terminal, thereby permitting said given data transferred from said terminal to be transferred through said dedicated channel, said packet transfer method further comprising:
in said dedicated channel exclusively allocated to said given terminal, when data transferred from said given terminal is waited because of an excessive quantity of transferred data, and further when a queuing data quantity of said data is equal to or greater than a delay data quantity-generating value, then a given terminal ID is provided to said transferred data in order to prevent said queuing data quantity from being equal to or greater than said delay data quantity-generating value, thereby transferring data through said shared channel.

10. A packet transfer method as defined in claim 9, wherein said delay data quantity-generating value can be set according to a number of calls.

11. A packet transfer method in a communication system including a plurality of terminals, a base station connected to said plurality of terminals via wireless lines, and a switching center linked to said base station via a plurality of wire lines, said plurality of wire lines including a shared channel and a dedicated channel in which said shared channel can be shared by said plurality of terminals, while said dedicated channel can be used by only one of said plurality of terminals, said packet transfer method comprising:
permitting data transferred from said plurality of terminals to be transferred by representing said data by a certain length, and
when a quantity of data transferred from a given terminal of said plurality of terminals is equal to or greater than a predetermined value, then said a plurality of allocating said dedicated channel to said given terminal, thereby permitting said given data transferred from said terminal to be transferred through said dedicated channel, said packet transfer method further comprising:
in said dedicated channel exclusively allocated to said given terminal, when data transferred to said given terminal is waited because of an excessive quantity of transferred data, and further when a queuing data quantity of said data is equal to or greater than a delay data quantity-generating value, then a given terminal ID is provided to said transferred data in order to prevent said queuing data quantity from being equal to or greater than said delay data quantity-generating value, thereby transferring data through said shared channel.

12. A packet transfer method as defined in claim 11, wherein said delay data quantity-generating value can be set according to a number of calls.

13. A packet transfer system including
a plurality of terminals,
a base station connected to said plurality of terminals via wireless lines, and
a switching center linked to said base station via a plurality of wire lines, said plurality of wire lines including a shared channel and a dedicated channel in which said shared channel can be shared by said plurality of terminals, while said dedicated channel can be used by only one of said plurality of terminals,
said packet transfer system operative for permitting data transferred from said plurality of terminals to be transferred separating said data by a certain length in a state of a sequence number being provided to said data, and
only when a quantity of data transferred to a given terminal of said plurality of terminals is equal to or greater than a predetermined value, then allocating said dedicated channel to said given terminal, thereby permitting transferred data from said given terminal to be transferred through said dedicated channel,
said base station including:
a measurement for means permitting a queuing data quantity of data transferred from said given terminal to be counted for each dedicated channel;
a mode-switching means for switching between a single channel mode and a multi-channel mode, said single channel mode permitting said dedicated channel to be applied to said given terminal, said multi-channel mode permitting said dedicated channel and an additional dedicated channel to be applied together to said given terminal;
a control means for comparing a count value obtained by said measurement means with a predetermined delay data quantity-generating value, and then providing control to switch said mode-switching means from said single channel mode into said multi-channel mode when said count value is greater than said delay data quantity-generating value based on result of such a comparison, said control means further comparing a count value obtained by said measurement means with a predetermined delay data quantity-restoring value, and then providing control to switch said mode-switching means from said multi-channel mode into said single channel mode when said count value is equal to or less than said delay data quantity-restoring value based on result of such a comparison;
a rearrangement means for permitting data to said given terminal to be rearranged in order of a sequence number upon receipt of said data when said mode-switching means switches from said single channel mode into said multi-channel mode;
a multi-receiving control means for requesting said switching center to resend data having an expected sequence number when such data needs to be resent from said switching center to said base station because said base station does not receive said data from said switching center after a certain period of time has elapsed; and,
a multi-receiving release means for confirming absence of transferred data through said additional dedicated channel when said mode-switching means switches from said multi-channel mode into said single channel mode.

14. A packet transfer system as defined in claim 13, wherein said delay data quantity-generating value and said delay data quantity-restoring value are individually set according to a number of calls.

15. A packet transfer system including
a plurality of terminals,
a base station connected to said plurality of terminals via wireless lines, and
a switching center linked to said base station via a plurality of wire lines, said plurality of wire lines including a shared channel and a dedicated channel in which said shared channel can be shared by said plurality of terminals, while said dedicated channel can be used by only one of said plurality of terminals,
said packet transfer system operative for permitting data transferred from said plurality of terminals to be transferred separating said data by a certain length in a state of a sequence number being provided to said data, and
only when a quantity of data transferred to a given terminal of said plurality of terminals is equal to or greater than a predetermined value, then allocating said dedicated channel to said given terminal, thereby permitting transferred data from said given terminal to be transferred through said dedicated channel, said switching center including:
a measurement means for permitting a queuing data quantity of data transferred to said given terminal to be counted for each dedicated channel;
a mode-switching means for switching between a single channel mode and a multi-channel mode, said single channel mode permitting said dedicated channel being applied to
said given terminal, said multi-channel mode permitting said dedicated channel and an additional dedicated channel to be applied together to said terminal;
a control means for comparing a count value obtained by said measurement means with a predetermined delay data quantity-generating value, and then permitting said mode-switching means to switch from said single channel mode into said multi-channel mode based on result of such a comparison, said control means further comparing a count value obtained by said measurement means with a predetermined delay data quantity-restoring value, and then permitting said mode-switching means to switch from said multi-channel mode into said single channel mode based on result of such a comparison;
a rearrangement means for permitting data from said terminal to be rearranged in order of a sequence number upon receipt of said data when said mode-switching means switches from said single channel mode into said multi-channel mode;
a multi-receiving control means for requesting said base station to resend data having an expected sequence number when such data needs to be resent from said base station to said switching center because said switching center does not receive said data from said base station after a certain period of time has elapsed; and,
a multi-receiving release means for confirming absence of transferred data through said additional dedicated channel when said mode-switching means switches from said multi-channel mode into said single channel mode.

16. A packet transfer system as defined in claim 15, wherein said delay data quantity-generating value and said delay data quantity-restoring value are individually be set according to a number of calls.

17. A packet transfer system including
a plurality of terminals,
a base station connected to said plurality of terminals via wireless lines, and
a switching center linked to said base station via a plurality of wire lines, said plurality of wire lines including a shared channel and a dedicated channel in which said shared channel can be shared by said plurality of terminals, while said dedicated channel can be used by only one of said plurality of terminals,
said packet transfer system operative for permitting data transferred from said plurality of terminals to be transferred separating said data by a certain length in a state of a sequence number being provided to said data, and
when a quantity of data transferred to a given terminal of said plurality of terminals is equal to or greater than a predetermined value, then allocating said dedicated channel to said given terminal, thereby permitting said data transferred from said given terminal to be transferred through said dedicated channel,
said base station including:
a measurement means for permitting a queuing data quantity of data transferred from said given terminal to be counted for each dedicated channel;
a rearrangement means for permitting data to be rearranged in order of a sequence number in order to allow for multi-receiving of said dedicated channel and said shared channel, even when said single dedicated channel is used; and,
a multi-receiving control means for requesting said switching center to resend data having an expected sequence number when such data needs to be resent from said switching center to said base station because said base station does not receive said data from said switching center after a certain period of time has elapsed.

18. A packet transfer system including
a plurality of terminals,
a base station connected to said plurality of terminals via wireless lines, and
a switching center linked to said base station via a plurality of wire lines, said plurality of wire lines including a shared channel and a dedicated channel in which said shared channel can be shared by said plurality of terminals, while said dedicated channel can be used by only one of said plurality of terminals,
said packet transfer system operative for permitting data transferred from said plurality of terminals to be transferred separating said data by a certain length in a state of a sequence number being provided to said data, and
when a quantity of data transferred to a given terminal of said plurality of terminals is equal to or greater than a predetermined value, then allocating said dedicated channel to said given terminal, thereby permitting said data transferred from said given terminal to be transferred through said dedicated channel,
said switching center including:
a measurement means for permitting a queuing data quantity of data transferred to said terminal to be counted for each dedicated channel;
a rearrangement means for permitting data to be rearranged in order of a sequence number in order to allow for multi-receiving of said dedicated channel and said shared channel, even when said single dedicated channel is used; and,
a multi-receiving control means for requesting said base station to resend data having an expected sequence number when such data needs to be resent from said base station to said switching center because said switching center does not receive said data from said base station after a certain period of time has elapsed.

19. A packet transfer system including
a plurality of terminals,
a base station connected to said plurality of terminals via wireless lines, and
a switching center linked to said base station via a plurality of wire lines, said plurality of wire lines including a shared channel and a dedicated channel in which said shared channel can be shared by said plurality of terminals, while said dedicated channel can be used by only one of said plurality of terminals,
said packet transfer system operative for permitting data transferred from said plurality of terminals to be transferred separating said data by a certain length in a state of a sequence number being provided to said data, and
only when a quantity of data transferred to a given terminal of said plurality of terminals is equal to or greater than a predetermined value, then allocating said dedicated channel to said given terminal, thereby permitting transferred data from said given terminal to be transferred through said dedicated channel, said base station including:
- a measurement for means permitting a queuing data quantity of data transferred from said given terminal to be counted for each dedicated channel;
- a mode-switching means for switching between a single channel mode and a multi-channel mode, said single channel mode permitting said dedicated channel to be applied to said given terminal, said multi-channel mode permitting said dedicated channel and an additional dedicated channel to be applied together to said given terminal;
- a control means for comparing a count value obtained by said measurement means with a predetermined delay data quantity-generating value, and then providing control switch said mode-switching means from said single channel mode into said multi-channel mode when said count value is greater than said delay data quantity-generating value based on result of such a comparison, said control means further comparing a count value obtained by said measurement means with a predetermined delay data quantity-restoring value, and then providing control to switch said mode-switching means from said multi-channel mode into said single channel mode when said count value is equal to or less than said delay data quantity-restoring value based on result of such a comparison;
- a rearrangement means for permitting data to said given terminal to be rearranged in order of a sequence number upon receipt of said data when said mode-switching means switches from said single channel mode into said multi-channel mode;
- a multi-receiving control means for requesting said switching center to resend data having an expected sequence number when such data needs to be resent from said switching center to said base station because said base station does not receive said data from said switching center after a certain period of time has elapsed; and,
- a means for permitting data to said terminal to be rearranged in order of a sequence number upon receipt of said data during said multi-channel mode, and then sending such rearranged data to said terminal.

20. A packet transfer system including
a plurality of terminals,
a base station connected to said plurality of terminals via wireless lines, and
a switching center linked to said base station via a plurality of wire lines, said plurality of wire lines including a shared channel and a dedicated channel in which said shared channel can be shared by said plurality of terminals, while said dedicated channel can be used by only one of said plurality of terminals, said packet transfer system operative for permitting data transferred from said plurality of terminals to be transferred separating said data by a certain length in a state of a sequence number being provided to said data, and only when a quantity of data transferred to a given terminal of said plurality of terminals is equal to or greater than a predetermined value, then allocating said dedicated channel to said given terminal, thereby permitting transferred data from said given terminal to be transferred through said dedicated channel, said switching center including:
- a measurement means for permitting a queuing data quantity of data transferred to said given terminal to be counted for each dedicated channel;
- a mode-switching means for switching between a single channel mode and a multi-channel mode, said single channel mode permitting said dedicated channel to be applied to said terminal, said multi-channel mode permitting said dedicated channel and an additional dedicated channel to be applied to said terminal;
- a control means for comparing a count value obtained by said measurement means with a predetermined delay data quantity-generating value, and then permitting said mode-switching means to switch from said single channel mode into said multi-channel mode based on result of such a comparison, said control means further comparing a count value obtained by said measurement means with a predetermined delay data quantity-restoring value, and then permitting said mode-switching means to switch from said multi-channel mode into said single channel mode based on result of such a comparison; and,
- a means permitting data from said terminal to be rearranged in order of a sequence number upon receipt of said data during said multi-channel mode, and then sending such rearranged data to a telephone network.

* * * * *